(No Model.)
R. McCULLY.
CRUSHING MACHINE.
No. 566,463. Patented Aug. 25, 1896.
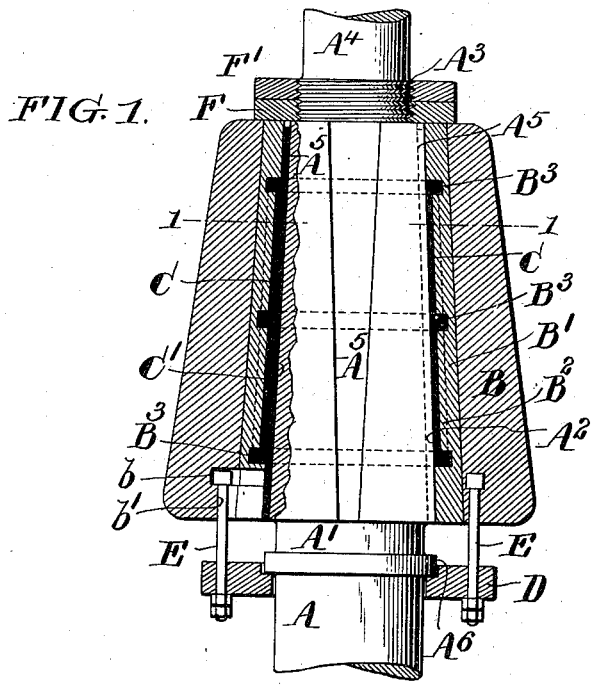
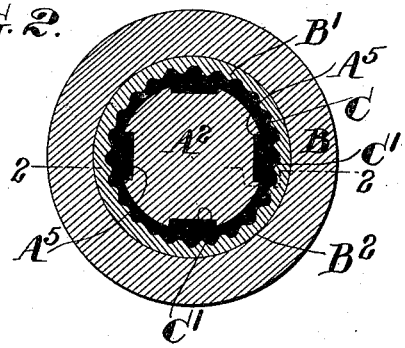
Witnesses.
Inventor.
Robert McCully
Attorney.

UNITED STATES PATENT OFFICE.

ROBERT McCULLY, OF PHILADELPHIA, PENNSYLVANIA.

CRUSHING-MACHINE.

SPECIFICATION forming part of Letters Patent No. 566,463, dated August 25, 1896.

Application filed March 4, 1896. Serial No. 581,755. (No model.)

*To all whom it may concern:*

Be it known that I, ROBERT MCCULLY, a citizen of the United States of America, residing in the city and county of Philadelphia, in the State of Pennsylvania, have invented a new and useful Improvement in Crushing-Machines, of which the following is a true and exact description, reference being had to the accompanying drawings, which form a part of this specification.

My invention relates to crushing-machines of the type known as "gyratory crushers," such, for instance, as is illustrated in my Patent No. 501,843, of July 18, 1893, and particularly my invention relates to the construction of the shaft and crushing-head of such crushers and to the means by which they are secured together, my object being to provide improved means for securing the head to the shaft.

The nature of my improvements will be best understood as described in connection with the accompanying drawings, in which they are illustrated, and in which—

Figure 1 is an elevation, partly in section, showing a part of the gyratory shaft and the head secured thereon; and Fig. 2 is a cross-section on the line 1 1 of Fig. 1.

A indicates the lower part of the shaft and $A^4$ the upper part thereof.

$A^2$ indicates a conical bearing formed of the metal of the shaft, and upon which the crushing-head is secured. Below the bottom of the conical bearing $A^2$ is an annular recess $A'$ of less diameter than the lower part of the bearing, and which may be, as indicated, of the same diameter as the portion A of the shaft, or may be of less diameter, the sole requisite feature of this recess being that the keyways indicated at $A^5$ and formed in the face of the conical bearing should merge into the recess $A'$. These keyways are preferably of a tapered form, narrowing from the top to the bottom of the bearing-surface.

$A^3$ indicates a threaded section on the shaft immediately above the top of the conical bearing, and $A^6$ is a collar forged on the shaft below the recess $A'$. As shown, and as I prefer to construct it, this collar extends but a short distance beyond the surface of the shaft and serves simply to provide a bearing for an annular ring or collar D, which is slipped up over the portion A of the shaft until its inner edge rests against the collar $A^6$, as indicated in the drawings.

B indicates the crusher-head, which I have shown as provided with an inner thickness $B'$ of softer metal than the outer or chilled surface of the head, and in this inner part of the head I provide a recess or chamber with longitudinally-running corrugations, as indicated at $B^2$, and I preferably also provide one or more circumferential grooves, as indicated at $B^3$, three being shown in the drawings.

E E are bolts which are secured in the bottom of the crusher-head in any convenient way. For instance, at the right-hand of Fig. 1 I have indicated the bolt E as cast in the portion B of the head, while to the left of the same figure the head portion B is indicated as provided with a slot $b$, extending from its inner periphery and with a communicating slot $b'$, the bolt E being slipped into these slots so that its head will enter the broader slot $b$ and its body pass downward through the narrow slot $b'$. Bolt-holes are provided in the ring D, through which these bolts can extend, and nuts on the under side of the ring serve to draw the bolts and head downward. F and $F'$ indicate nuts screwing on the portion $A^3$ of the shaft, and also serving the purpose of forcing the head B down upon the conical bearing $A^2$.

The top and bottom portion of the lining or inner portion $B'$ of the head are tapered to correspond with the taper of the conical bearing, so that they will fit directly upon said bearing when the head is in place, leaving a recess formed by the corrugated chamber in the center of the head. Soft metal (indicated at C) is then poured in through the top of one or more of the keyways $A^5$, (or through gates made for that purpose,) the bottom ends of which are plugged to prevent the escape of the molten metal, and the soft metal completely fills the annular chamber between the head and conical bearing-surface forming keys $C'$, integral with the rest of the filling, which fill the keyways $A^5$ and prevent turning of the head upon its bearing.

It is well known that owing to the great strains to which these crushing-heads are subjected they have a tendency to get loose upon the bearing-surfaces which hold them, and various devices have been invented for preventing or remedying this trouble. By my device the head is adjusted and tightened upon the conical bearing by drawing it downward, this action also tightening the keys in the keyways because of the tapered form of the keyways and keys, the keys in this construction forming, practically, a part of the head and of course moving downward with it. All tendency to side play of the crusher-head with reference to the keys is effectually prevented by the vertically-running corrugations on the inside of the head and the corresponding registering corrugations of the soft-metal filling C, which is formed integral with the keys, and obviously the circumferential grooves $B^3$ provide ample means for preventing longitudinal movement of the keys with respect to the head.

While the head may be held in place and adjusted by means of nuts F F', I prefer the construction by which the head is drawn down by means of its depending bolts E and the ring D, and while it is an important improvement to construct the shaft with a light collar $A^6$ and couple the bolts to the detachable ring D, it is still within the broader features of my invention if the ring D be forged solid with the shaft. Of course it will be understood that the function of the annular recess A' is to permit the further downward movement of the keys.

Having now described my invention, what I claim as new, and desire to secure by Letters Patent, is—

1. A shaft for a crushing-machine having a conical bearing $A^2$ for a crusher-head, an annular recess as A' below and of less diameter than the base of said bearing and keyways formed in the face of the bearing and opening freely to their entire depth in the annular recess in combination with a crusher-head adapted to fit on the conical bearing, keys engaged with the head and in the keyways of the bearing and means for forcing the head and keys down upon the bearing.

2. A shaft for a crushing-machine having a conical bearing $A^2$ for a crusher-head, an annular recess as A' below and of less diameter than the base of said bearing and downwardly-tapered keyways formed in the face of the bearing and opening freely to their entire depth in the annular recess in combination with a crusher-head adapted to fit on the conical bearing, tapered keys engaged with the head and in the keyways of the bearing and means for forcing the head and keys down upon the bearing.

3. A shaft for a crushing-machine having a conical bearing $A^2$ for a crusher-head, an annular recess as A' below and of less diameter than the base of said bearing and downwardly-tapered keyways formed in the face of the bearing and opening freely to their entire depth in the annular recess in combination with a crusher-head adapted to fit on the conical bearing, tapered keys of soft metal engaged with the head and in the keyways of the bearing and means of forcing the head and keys down upon the bearing and in the keyways.

4. A shaft for a crushing-machine having a conical bearing $A^2$ for a crusher-head, an annular recess as A' below and of less diameter than the base of said bearing and keyways formed in the face of the bearing and opening freely in the annular recess in combination with a crusher-head having a longitudinally-ribbed central cavity, said head being adapted to fit on a conical bearing, a soft-metal filling for the ribbed cavity and keys cast integral with said filling and also cast in the keyways of the bearing and means for forcing the head and its keys down upon the conical bearing.

5. A shaft for a crushing-machine having a conical bearing $A^2$ for a crusher-head, keyways formed in the face of said conical bearing and a collar as $A^6$ formed on the shaft below the bearing in combination with an annular removable ring as D adapted to rest against the under side of ring $A^6$, a crusher-head resting on and keyed to the bearing and bolts engaged with the crusher-head and passing through the removable ring whereby the head is clamped to and adjusted on the conical bearing.

R. McCULLY.

Witnesses:
 ROBERT W. LLOYD,
 D. STEWART.